(12) United States Patent  
Chlebowski et al.

(10) Patent No.: US 9,739,664 B2  
(45) Date of Patent: Aug. 22, 2017

(54) METHOD OF MEASURING TEMPERATURE OF A HEATED PART

(71) Applicant: PRATT & WHITNEY CANADA CORP., Longueuil (CA)

(72) Inventors: Robert Chlebowski, Toronto (CA); William Miles, Mississauga (CA); Leo Zalewski, Victoria (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 14/551,428

(22) Filed: Nov. 24, 2014

(65) Prior Publication Data

US 2016/0146670 A1   May 26, 2016

(51) Int. Cl.  
*G01J 5/00*   (2006.01)

(52) U.S. Cl.  
CPC .......... *G01J 5/0066* (2013.01); *G01J 5/0003* (2013.01); *G01J 2005/0051* (2013.01); *G01J 2005/0077* (2013.01)

(58) Field of Classification Search  
CPC ..................................................... G01J 5/0066  
See application file for complete search history.

(56) References Cited

U.S. PATENT DOCUMENTS

| | | | | |
|---|---|---|---|---|
| 3,575,873 A | * | 4/1971 | Carver | C09D 5/22 250/484.4 |
| 7,578,178 B2 | | 8/2009 | Boyer et al. | |
| 7,746,458 B2 | * | 6/2010 | Beaume | 356/237.1 |
| 8,834,095 B2 | | 9/2014 | Davis | |
| 2004/0081221 A1 | * | 4/2004 | Sandvoss | G01N 25/72 374/130 |
| 2007/0097360 A1 | * | 5/2007 | Beaume | G01N 21/91 356/237.1 |
| 2009/0312956 A1 | * | 12/2009 | Zombo et al. | 702/34 |
| 2009/0321415 A1 | * | 12/2009 | Zhang | H05B 1/0294 219/528 |
| 2010/0033565 A1 | * | 2/2010 | Benzerrouk et al. | 348/125 |
| 2010/0315422 A1 | * | 12/2010 | Andre | G06T 7/0057 345/426 |

FOREIGN PATENT DOCUMENTS

DE   102011010066 A1 *  8/2012

OTHER PUBLICATIONS

Translation of DE 102011010066.*

* cited by examiner

*Primary Examiner* — David Porta  
*Assistant Examiner* — Hugh H Maupin  
(74) *Attorney, Agent, or Firm* — Norton Rose Fulbright Canada LLP

(57) ABSTRACT

A method of measuring temperature of a part heated during a heating process includes applying a non-reactive coating at a first temperature; heating the part, and thereby the coating thereon, to a second temperature greater than the first temperature; and measuring a temperature distribution of the part by measuring infrared light emitted from the heated coating using a thermal imaging device calibrated to the known emissivity of the coating. The coating is at least partially opaque and having a known emissivity of infrared light and conducts thermal energy from the underlying part.

16 Claims, 3 Drawing Sheets

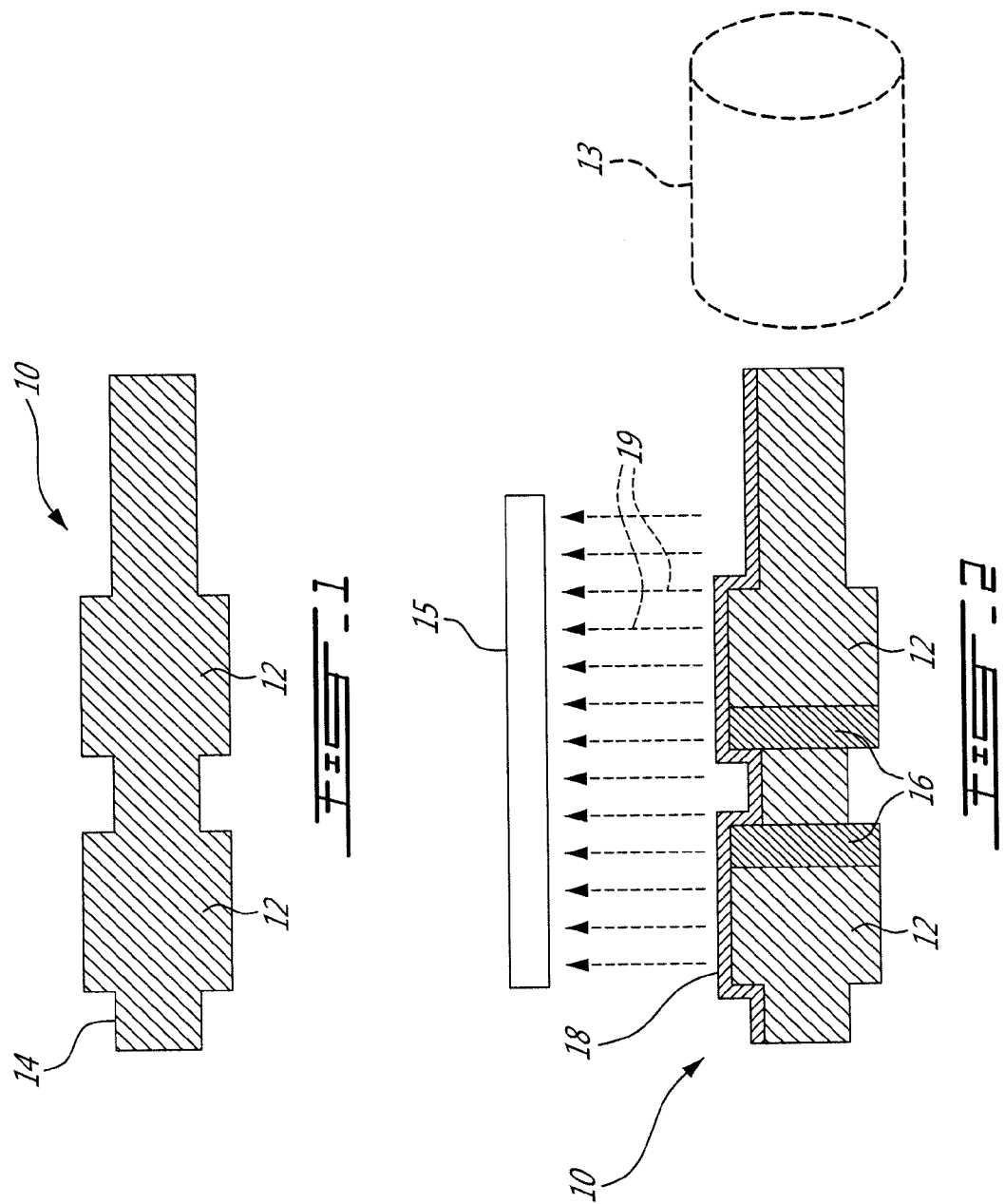

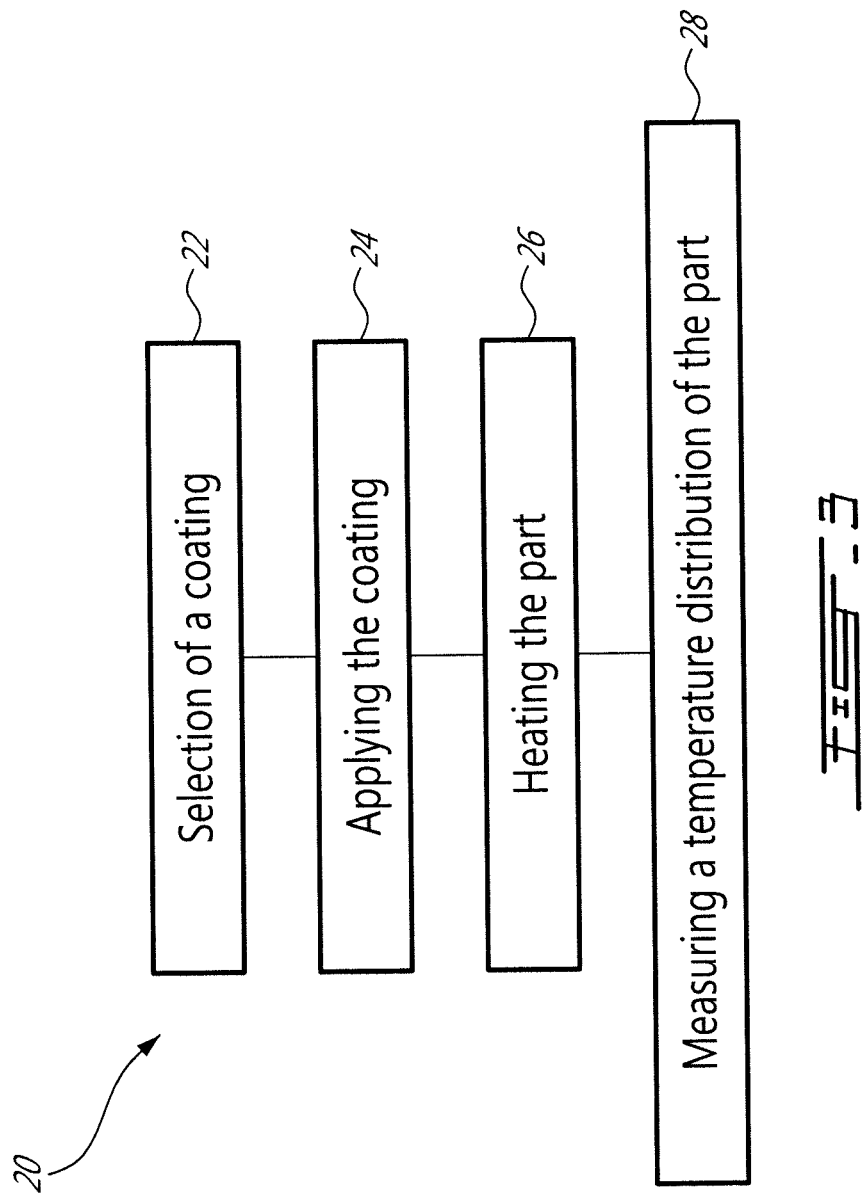

METHOD OF MEASURING TEMPERATURE OF A HEATED PART

TECHNICAL FIELD

The application relates generally to thermal imaging and, more particularly, to method for using thermal imaging in the context of heating a part.

BACKGROUND OF THE ART

When heating a metallic part at a given temperature, some areas of the part may heat at a higher temperature than the given heating temperature, resulting in localised high temperature areas on the part. These localised areas of high temperatures are commonly known as hot spots. Hot spots may be so hot that they could locally weaken the part. Traditional temperature measurements such as pyrometers and thermocouples do not easily allow the identification of these hot spots.

SUMMARY

In one aspect, there is provided a method of measuring temperature of a part heated during a heating process, the method comprising: applying a non-reactive coating at a first temperature, the coating being at least partially opaque and having a known emissivity of infrared light; heating the part, and thereby the coating thereon, to a second temperature greater than the first temperature, the coating conducting thermal energy from the underlying part; and measuring a temperature distribution of the part by measuring infrared light emitted from the heated coating using a thermal imaging device calibrated to the known emissivity of the coating.

In another aspect, there is provided a method of controlled heating of a part, the method comprising: heating the part using a heating process; measuring the temperature of the part as defined above; identifying local hot areas of a surface of the part having a temperature above a predetermined third temperature, the third temperature being higher than the second temperature; and connecting a localised temperature measuring device to the surface of the part at the identified local hot areas.

DESCRIPTION OF THE DRAWINGS

Reference is now made to the accompanying figures in which:

FIG. 1 is a schematic of a part at ambient temperature;

FIG. 2 is a schematic of the part of FIG. 1 heated at a temperature higher than ambient temperature and showing hot spots;

FIG. 3 illustrates a method of measuring a temperature distribution; and

DETAILED DESCRIPTION

Figure 4:
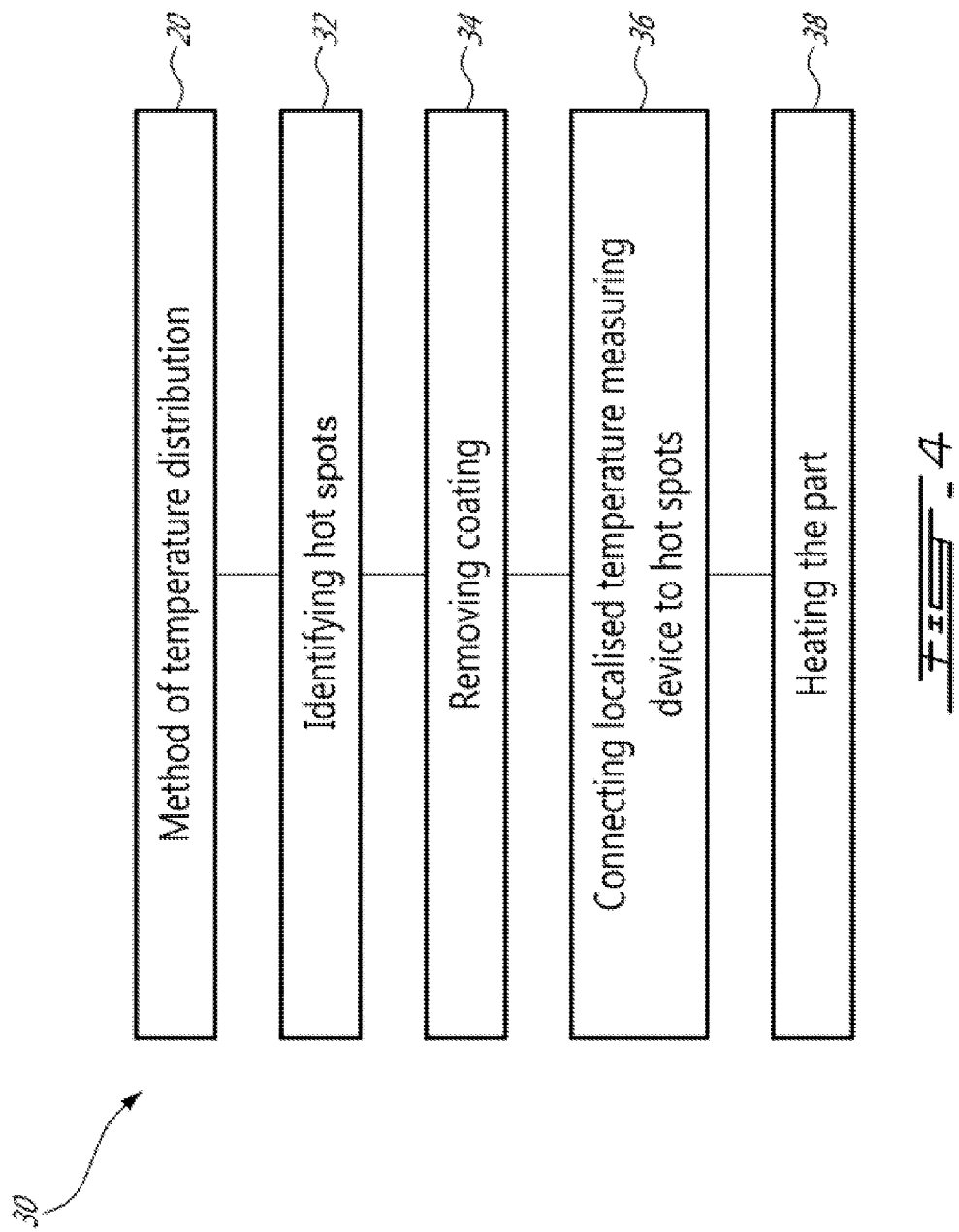
FIG. 4 illustrates a method of controlled heating of the part using the method of measuring the temperature distribution of FIG. 3.

Referring to FIG. 1, a schematic of a part 10 is illustrated at ambient temperature. In one embodiment, the part 10 is metallic, but it could be made of various materials. In one embodiment, the part 10 could be made of any material that can be heated by electromagnetic induction or have features made of non-metallic materials that are in contact with features that can be heated by electromagnetic induction and where there is a transfer of heat between these materials.

The part 10 could have various shapes and purposes. In the illustrated embodiment, the part 10 is a hollow shaft to be used in a gas turbine engine. The part 10 could be plain or hollow. The part 10 may not have a uniform geometry, and includes features 12. Examples of features 12 could be protrusions, a section of smaller diameter, a threading, etc. The features 12 accordingly form discontinuities of an external surface 14 of the part 10.

Turning to FIG. 2, the part 10 may be heated by a heating device 13. The part 10 may be heated for various purposes, including for example expanding an opening of the part slightly so as to tight fit it with another part (snap fit). The tolerances for clearance and balance of rotating parts in gas turbine engines are extremely small. The inner diameter of a part that will receive an outer diameter feature of another part may be practically of the same size; consequently, it may difficult to assemble the parts together. Heating the part having the opening to temporarily increase its diameter may provide the necessary clearance to receive the part to be fitted into this opening. The part to be fitted into the opening is not heated therefore not expanded and might even be cooled to contract its size. Sometimes both hot and cold processes are employed to fit parts together.

The part 10 may be heated using various processes. In a tight fitting operation, one may want to heat the part 10 quickly, and as a result use induction heating as a heating process. Induction heating is the process of heating an electrically conducting object by electromagnetic induction, where eddy currents are generated within the metal and resistance leads to Joule heating of the metal. Inductive heating may heat the part 10 quicker than other heating processes, but may create a non-uniform heating as a result. It could be, for example, that the features 12 or other areas of the part 10, heat at higher temperatures than a rest of the part 10. The zones of higher temperature are commonly known as hot spots 16. Examples of hot spots 16 are shown in FIG. 2. In some cases, a temperature of a hot spot becomes so high that it will induce stresses in the part 10 which in turn may weaken the part 10.

Turning now to FIG. 3, a method 20 of measuring the temperature of the part 10 heated during a heating process, so as to identify for example hot spots 16, will now be described.

The method 20 uses a removable, non-binding coating of thermally conductive material deposited onto the part 10 to determine the temperature of the surface 14 of the part 10 by measuring the infra-red (IR) light emitted by the heated coating.

The method 20 starts at step 22 with the selection of a coating 18 (schematically illustrated in FIG. 2) that enhances the thermal imaging of the part 10. The coating 18 may be selected to be thermally conductive so that its temperature will be the temperature of the underlying part 10. The coating 18 may have a known emissivity so that a thermal imaging device can be calibrated to record emitted IR only at that emissivity. A schematic of a thermal imaging device 15 and emitted IR light 19 is shown in FIG. 2. The coating 18 may be non-reactive with the underlying part 10 at the temperatures involved in the process. For example, if the part 10 is to be heated at a predetermined temperature in view of a tight-fit engagement with another part, the coating 18 may be selected to non-react with (i.e. be inert relative to) the underlying part 10 at any temperature from ambient to the predetermined temperature. The term "non-react" or "non-reacting" as used herein is defined as meaning that no chemical reaction occurs between the coating 18 and the underlying part, and/or does not bind to the underlying part 10 (unless it is a molecular adhesion). Examples of chemical reactions may include corrosion, staining, or binding with the underlying part 10. The coating 18 may have some opacity so that a reading of the emissivity by the thermal imaging device 15 may not be affected by the underlying part 10. Opacity is indicative of the degree to which the coating 18 does not reflect or refract light from other sources. In some embodiments, the coating 18 is totally opaque in other embodiments, the coating 18 is partially opaque (i.e. partially transparent). It is expected that the greater the opacity, the better the reading by the thermal imaging device 15.

In addition, the coating 18 may have other characteristics selected so as to enhance the thermal imaging process. For example, the coating 18 may be selected to have a high emissivity. It is expected that the higher the emissivity, the better the thermal imagine reading. The coating 18 may also be selected to have a higher emissivity than the part 10. The coating 18 may be a fine powder. The fine powder may allow the coating 18 to be disposed uniformly onto the external surface 14 of the part 10, and as a result provide a more accurate thermal reading. The coating 18 may further be selected to have faceted grains. A granular, faceted consistency may emit IR 19 light in all directions (non-cohesive emissions) and off-axis camera views as a result of complex part geometry may be more accurately imaged. The grains may be selected to be matte (i.e. not shiny). A shiny coating may emit IR light to a lesser degree in response to being heated by the underlying part but it also may reflect IR light that is emitted from other sources thus confounding the measurement. As a result, a shiny coating may corrupt to some extent the thermal reading. The grains may also be selected to have a small diameter. It is expected that small grains may not block openings, ridges, passages and the like defined in the surface 14 or obliterate surface details. In addition, small grain sizes may provide a coating 18 of a relatively small thickness, which in turn, may favor heat conduction from the underlying part.

Additional characteristics may be taken into account for the selection of the coating 18. Some coatings 18 may have some if not all of the desired characteristics. Talcum powders, for example, are thermally conductive, have a known emission, are non-reactive and have opacity. In addition, talcum powders have a high emissivity (about 0.95), are totally opaque, have very fine faceted grains, and are matte. Talcum powder is only one example of coating 18 that may be suitable for the thermal imaging process described herein. Other coating 18, mineral or not, having some or all of the above characteristics are contemplated. These coating 18 may be solid, liquid or in gel form.

From step 22, the method 20 goes to step 24, where the coating 18 is applied to the part 10. There are various ways to apply the coating 18. In one embodiment, the coating 18 is solely deposited onto the part 10 and may stay thereonto by gravity and/or static forces. The coating 18 may be brushed onto the surface 14. The coating 18 may be sprayed onto the surface 14. In one embodiment, a dispersive liquid, such as alcohol, may be used to project the coating 18 in a powder form onto the surface 14. When the dispersive liquid is evaporated, the coating 18 may lightly adhere (by cohesive forces) to the surface 14. The spraying with a dispersive liquid may provide a more uniform repartition of the coating 18. Other ways of disposing the coating 18 are contemplated. The coating 18 is usually deposited onto the part 10 at ambient temperature.

From step 24, the method 20 goes to step 26, where the part 10 is heated. In one embodiment, the part 10 is heated by induction heating. As a result of being heated, the surface 24 goes from ambient temperature (i.e. first temperature T1) to a higher temperature (i.e. a second temperature T2). The higher temperature may correspond to a temperature needed to accomplish a specific task, e.g. the tight fitting of the part 10 with a mating part. The coating 18 being thermally conductive will have the same temperature as the surface 14 (i.e. temperature T2). While the surface 14 should have theoretically the same temperature as the temperature of the induction heating (i.e. temperature T2), the surface 14 may not be informally heated. As mentioned earlier, some portions of the surface 14 may be at a temperature higher than that of the induction heating temperature T2. These portions may become the hot spots 16. The hot spots 16 may all be at the same temperature or have different temperatures. Yet, they all have a temperature above a predetermined temperature (i.e. a third temperature T3).

In order to visualise these hot spots, the method 20 goes to step 28, where a temperature distribution of the part 10 is measured. A thermal imaging device 15 is used to measure IR light 19 emitted by the coating 18 conducting heat from the part 10 covered by the coating 18. When calibrated at the emissivity of the coating 18 (e.g. 0.95 for the talcum), the thermal imaging device 15 will record IR light 19 emitted by the coating 18 only, since it is the one that has that particular emissivity. The IR light emitted 19 is related to a temperature of the coating 18, and as a result to a temperature of the surface 14 of the part 10. The thermal imaging device 15 allows thus a spatial measurement of the IR light 19. By measuring how much IR light 19 is emitted at each location on the surface 14, the thermal imaging device 15 can provide a map of the temperature distribution of each location on the surface 14. The application of the coating 18 having a higher emissivity than the underlying part may allow a better visualisation of the temperature distribution. In addition, in cases where the part 10 may have more than one emissivity, the application of the coating 18 allows to calibrate the thermal imaging device 15 to only one emissivity.

Turning now to FIG. 4, a method 30 of controlled heating of the part 10 will be described. The method 30 starts at the end of method 20.

At step 32, using the map of temperature distribution, one can identify the location of the hot posts as well as their temperature when the part 10 is heated at the second temperature T2. This information can thus be used to later heat the part 10 at a temperature which will prevent the hot spots 16 to reach a temperature above the third temperature T3. Once the hot spots 16 locations are identified, a localised measuring device (e.g. thermometer, pyrometer) may be placed on the hot spots 16 to control their temperature.

From step 32, the method 30 goes to step 34, where the coating 18 is removed from the part 10, once the hot spots are identified. As mentioned before, the coating 18 is not strongly attached to the surface 14 of the part 10, and may be removed by dusting it off, or brushing it off for example. Once the coating 18 removed, the surface 14 is in a same state as it was before applying the coating 18. No scratching or damaging of the surface 14 should appear.

From step 34, the method 30 goes to step 36, where the localised measuring device may be physically connected to one or more of the hot spots 16 identified at step 28.

From step 36, the method 30 goes to step 38, where the part 10 may be heated again to a temperature required for a specific action. This could be the temperature T1 or a similar temperature required for tight-fitting the part 10 with another part. The heating is done in a controlled fashion. With the hot spots 16 located and whose temperature is monitored by the localised temperature device, the heating at the temperature required for the specific action can be done while ensuring the hot spots 16 do not reach the thirds temperature T3. As a result, the part 10 may be heated without incurring undue stresses in the hot spots 16. In turn, the part 10 may retain some if not all of its original mechanical properties.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A non-destructive method of measuring temperature of a part heated during a heating process, the method comprising:
    applying a temporary, non-reactive coating to an outer surface of the part at a first temperature, the coating being at least partially opaque and having a known emissivity of infrared light, the coating being a thermal conductor having limited thermal insulating properties, the coating being a mineral powder coating which includes grains having a plurality of facets;
    heating the part, and thereby the coating thereon, to a second temperature greater than the first temperature, the coating conducting thermal energy from the underlying part;
    measuring a temperature distribution of the part by measuring infrared light emitted from the heated coating using a thermal imaging device calibrated to the known emissivity of the coating; and
    removing the temporary, non-reactive coating from the part after determining the temperature distribution of the part.

2. The method of claim 1, wherein applying the coating onto the part comprises applying a totally opaque coating onto the part.

3. The method of claim 1, wherein applying the coating onto the part comprises applying a thin layer of the coating onto the part.

4. The method of claim 1, wherein applying the coating onto the part comprises applying a uniform layer of the coating onto the part.

5. The method of claim 1, wherein applying the coating onto the part comprises applying a talcum powder coating onto the part.

6. The method of claim 1, wherein applying the coating comprises applying a matte coating.

7. The method of claim 1, wherein removing the coating from the part comprises dusting off the coating.

8. The method of claim 1, wherein applying the coating onto the part comprises spraying the coating onto the part.

9. The method of claim 8, wherein spraying the coating onto the part comprises spraying a mixture of dispersive liquid and powder of the coating.

10. The method of claim 1, wherein applying the coating comprises applying the coating having a known emissivity higher than an emissivity of the part.

11. The method of claim 1, wherein applying the coating comprises applying the coating having a known emissivity of at least 0.95.

12. The method of claim 1, further comprising identifying areas of a surface of the part having a temperature above a predetermined temperature after determining the distribution of temperature of the part.

13. A method of controlled heating of a part, the method comprising:
    heating the part using a heating process;
    measuring the temperature of the part as defined in claim 1;
    identifying local hot areas of a surface of the part having a temperature above a predetermined third temperature, the third temperature being higher than the second temperature; and
    connecting a localised temperature measuring device to the surface of the part at the identified local hot areas.

14. The method of claim 13, further comprising heating the part to a temperature below the third temperature after connecting the localised temperature measuring device to the identified local hot areas.

15. The method of claim 14, wherein heating the part at a temperature below the third temperature comprises induction heating the part.

16. The method of claim 15, further comprising removing the coating from the part.

* * * * *